UNITED STATES PATENT OFFICE.

RAEMER REX RENSHAW, OF AMES, IOWA.

PROCESS FOR MAKING FODDER.

1,190,953.

Specification of Letters Patent. Patented July 11, 1916.

No Drawing. Application filed September 2, 1914. Serial No. 859,798.

*To all whom it may concern:*

Be it known that I, RAEMER REX RENSHAW, a citizen of the United States, and a resident of Ames, in the county of Story and State of Iowa, have invented a new and Improved Process for Making Fodder, of which the following is a full, clear, and exact description.

My invention relates to a process of treating cellulose materials rich in pentosans, such as corn cobs, cereal straws, sugar beet residues, sugar-cane stalks, or similar materials, using the whole of these materials for the purpose of improving their digestibility and palatability to animals, and also to reduce the tendency of such materials to injure the mouth of the animal.

A further object of the invention is to convert the above stated waste products into a fodder which contains pentoses and which pentoses are the product of the treatment of the waste material and can be separated from the product if desired.

My process consists in hydrolyzing the pentosans of the materials such as stated by heating the said materials to 130 or 135 degrees centigrade, preferably under pressure, along with a mineral acid. The pressure employed is preferably from two to three atmospheres, and the acid is diluted to contain from .2 to $1\frac{1}{2}\%$ by weight of acid, and, preferably, sulfuric or hydrochloric acid is used. I take from one-quarter to three times as much by weight of acid solution as weight of material acted upon. The cellulose material is heated with a hydrolyzing solution, preferably by means of live steam under pressure, until the whole contents of the charge have been heated to the specified temperature for about two minutes. The temperature at which the treatment is made is such that it will completely hydrolyze the pentosans yielding pentoses without materially affecting the cellulose other than to dissolve out the pentoses, leaving the residual cellulose material in softened condition and, therefore, not injurious to the mouths of cattle. At the temperature at which the complete hydrolyzation of the pentoses takes place, none of the true sugars are obtained, that is, no fermentable or glycogen-forming carbohydrates. Therefore the true cellulose is practically not at all hydrolyzed. When the hydrolyzation has been completed the pressure is reduced and any excess of acid used is neutralized by a suitable base and the resulting wet material dried, with or without stirring it. The pentoses resulting from the hydrolyzation are deposited upon the unaffected cellulose material, making it palatable. In this process of hydrolyzing the pentosans associated with the cellulose under pressure with diluted inorganic acid, the same are rendered more digestible and the resulting mass is easily crumbled when used in the dry state, and, therefore, not injurious to the mouth of the animal.

If desired, the pentoses may be separated from the resulting mass and used for other purposes, while the remaining mass can be used as roughage. At the temperature stated practically no cellulose is hydrolyzed, and probably no fermentable sugar is obtained. The pentosans, however, are almost completely transformed to water soluble products, mostly pentoses. These are dissolved in the water used for the hydrolysis, and they are separated from the unacted-upon cellulose by any approved method of separating solutions from solids, as filtration, centrifuging, etc. The solution containing the pentoses may then be evaporated and the pentoses used in the crude form or they may be further purified and used for any purpose desired, or the solution may be used directly for any purpose the virtue of which depends on the pentoses present.

From the above description it will be seen that my process consists in hydrolyzing the pentosans of cellulose material so that the same will be rendered more digestible and palatable and can be used as a fodder, or for roughage when the pentoses associated with the treated cellulose are removed.

Having thus described my invention, I claim as new and desire to secure by Letters Patent:

1. In a process for making fodder from cellulose substance rich in pentosans, a step consisting in substantially hydrolyzing the pentosans contained in the substance without materially affecting the cellulose of the substance.

2. In a process for making fodder from material rich in pentosans, a step consisting in subjecting said material to heat and the action of an inorganic acid to hydrolyze only the pentosans contained in said material.

3. A process for making fodder from material rich in pentosans consisting in subjecting the said material to heat, pressure and the action of an inorganic acid to substantially hydrolyze the pentosans of the material, and then removing the pentoses produced by the action of the hydrolyzation of said material.

4. A process for making fodder from material rich in pentosans consisting in subjecting the cellulose material to heat, pressure of about three atmospheres and the action of an inorganic acid to substantially hydrolyze the pentosans present in the material and then drying the resultant mass.

5. A process for making fodder from material rich in pentosans consisting in subjecting the material to heat, pressure of about three atmospheres and the action of inorganic acid for about two minutes to hydrolyze only the pentosans present in the material, then neutralizing any excess of inorganic acid, and then drying the resulting mass.

6. A process of making fodder from corn cobs and similar materials, which consists in subjecting the corn cobs to heat, pressure and the action of inorganic acid to substantially hydrolyze the pentosans present in the cobs without materially affecting the cellulose material in the cobs.

7. A process of making fodder and pentoses from corn cobs, which consists in subjecting the corn cobs to heat, pressure and the action of inorganic acid to substantially hydrolyze the pentosans present in the corn cobs without materially affecting the cellulose material in the cob, and then separating the pentoses from the cellulose material.

In testimony whereof I have signed my name to this specification in the presence of two subscribing witnesses.

RAEMER REX RENSHAW.

Witnesses:
BENEDICT JOFFE,
PHILIP D. ROLLHAUS.